United States Patent
Yasui et al.

(10) Patent No.: US 8,917,407 B2
(45) Date of Patent: Dec. 23, 2014

(54) IMAGE FORMING APPARATUS, IMAGE FORMING SYSTEM, AND IMAGE FORMING METHOD THAT CAUSE A JOB EXECUTION SCREEN TO BE DISPLAYED ON A DISPLAY OF A TERMINAL APPARATUS

(75) Inventors: Toru Yasui, Osaka (JP); Tetsuya Maeda, Osaka (JP); Kensaku Sugimoto, Osaka (JP)

(73) Assignee: KYOCERA Document Solutions Inc. (JP)

( * ) Notice: Subject to any disclaimer, the term of this patent is extended or adjusted under 35 U.S.C. 154(b) by 228 days.

(21) Appl. No.: 13/244,539

(22) Filed: Sep. 25, 2011

(65) Prior Publication Data

US 2012/0075658 A1 Mar. 29, 2012

(30) Foreign Application Priority Data

Sep. 24, 2010 (JP) ................. 2010-214157

(51) Int. Cl.
*G06K 15/02* (2006.01)
*H04N 1/00* (2006.01)
*G06F 3/12* (2006.01)
*G06F 15/16* (2006.01)

(52) U.S. Cl.
CPC .......... *H04N 1/00222* (2013.01); *G06F 3/1207* (2013.01); *G06F 3/1253* (2013.01); *G06F 3/1285* (2013.01); *G06F 3/1292* (2013.01); *H04N 1/00464* (2013.01); *H04N 1/00482* (2013.01); *H04N 2201/0039* (2013.01); *H04N 2201/0075* (2013.01); *H04N 2201/0081* (2013.01); *H04N 2201/0094* (2013.01); *H04N 2201/0091* (2013.01); *H04N 2201/0082* (2013.01)

USPC ....... 358/1.14; 358/1.13; 358/1.15; 358/1.16; 709/219; 709/217; 709/203

(58) Field of Classification Search
None
See application file for complete search history.

(56) References Cited

U.S. PATENT DOCUMENTS

| | | | | |
|---|---|---|---|---|
| 6,327,045 | B1 * | 12/2001 | Teng et al. | 358/1.15 |
| 6,741,853 | B1 * | 5/2004 | Jiang et al. | 455/418 |
| 7,284,040 | B2 * | 10/2007 | Kobayashi et al. | 709/219 |
| 8,554,792 | B1 * | 10/2013 | Ahmed et al. | 707/781 |
| 2002/0198923 | A1 * | 12/2002 | Hayes, Jr. | 709/102 |
| 2004/0054963 | A1 * | 3/2004 | Kobayashi et al. | 715/500 |
| 2004/0215734 | A1 | 10/2004 | Nagai et al. | |
| 2007/0038954 | A1 * | 2/2007 | Ozaki | 715/788 |
| 2009/0040537 | A1 * | 2/2009 | Iwai et al. | 358/1.2 |
| 2011/0063667 | A1 * | 3/2011 | Nishida | 358/1.15 |

FOREIGN PATENT DOCUMENTS

| | | |
|---|---|---|
| JP | 2004-009688 | 1/2004 |
| JP | 2004-199190 | 7/2004 |
| JP | 2004-206456 | 7/2004 |
| JP | 2006-302117 | 11/2006 |

* cited by examiner

*Primary Examiner* — Peter K Huntsinger
*Assistant Examiner* — Pawandeep Dhingra
(74) *Attorney, Agent, or Firm* — McDonnell Boehnen Hulbert & Berghoff LLP (57) ABSTRACT

An image forming apparatus that is connected to a network includes a web server, a setting item management unit, and a web server management unit. The setting item management unit is configured to select, when the web server receives a request for job execution screen data from a terminal apparatus that is connected to the network, a job setting item in association with at least one of the terminal apparatus and a user at the terminal apparatus from among all job setting items. The web server management unit is configured to generate the job execution screen data that includes the job setting item selected by the setting item management unit and transmit the job execution screen data to the terminal apparatus via the web server.

5 Claims, 6 Drawing Sheets

SET PARAMETER VALUE

PAPER OUTPUT

INNER TRAY ▼

DUPLEX

ONE-SIDED ▼

COMBINE

2 IN 1 ▼

LAYOUT : LEFT TO LIGHT/UP TO DOWN ▼

BOUNDARY LINES : OFF ▼

BOOKLET

OFF ▼

ZOOM

○ AUTO   ● 100%

ECOPRINT

IMAGE FORMING APPARATUS, IMAGE FORMING SYSTEM, AND IMAGE FORMING METHOD THAT CAUSE A JOB EXECUTION SCREEN TO BE DISPLAYED ON A DISPLAY OF A TERMINAL APPARATUS

INCORPORATION BY REFERENCE

This application is based upon, and claims the benefit of priority from, corresponding Japanese Patent Application No. 2010-214157, filed in the Japan Patent Office on Sep. 24, 2010, the entire contents of which is incorporated herein by reference.

BACKGROUND

1. Field

The present invention relates to an image forming apparatus, an image forming system, and an image forming method that cause a job execution screen to be displayed on a display of a terminal apparatus.

2. Description of the Related Art

A typical image forming apparatus such as a printer, a copier, and a multifunction peripheral (MFP) includes a web server. When a web browser of a terminal apparatus such as a personal computer transmits a request for hypertext markup language (HTML) data to a universal resource locator (URL) of the image forming apparatus, the image forming apparatus transmits the HTML data that includes status information at the present time to the terminal apparatus. The web browser of the terminal apparatus displays the status information on the basis of the HTML data. The status information indicates the state of an internal device such as a printer, a facsimile device, and the like, and takes a value such as "no abnormality" or "communication error".

In addition, the web browser of the terminal apparatus receives the HTML data of a job execution screen data from the image forming apparatus, and displays a job execution screen on the basis of the HTML data. When the web browser detects a specified operation via the job execution screen, the web browser transmits a command to execute a job, for example, printing or transmission of document data to the image forming apparatus, and causes the image forming apparatus to execute the job.

The image forming apparatus includes a large number of job setting items (for example, double-sided printing setting, multiple pages grouping per paper setting, enlargement/reduction printing setting, or color mode setting) that are set when a job is executed. Therefore, when the terminal apparatus causes the image forming apparatus to execute a job, displaying all the job setting items and input portions (for example, an input field, a menu, a check box, and a radio button) for all the job setting items on the job execution screen makes the job execution screen complicated and makes user operation difficult.

SUMMARY

The present disclosure relates to an image forming apparatus, an image forming system, and an image forming method that cause an easy-to-operate job execution screen to be displayed on a display of a terminal apparatus.

According to an aspect of the present disclosure, an image forming apparatus that is connected to a network includes a web server, a setting item management unit, and a web server management unit. The setting item management unit is configured to select, when the web server receives a request for job execution screen data from a terminal apparatus that is connected to the network, a job setting item in association with at least one of the terminal apparatus and a user at the terminal apparatus from among all job setting items. The web server management unit is configured to generate the job execution screen data that includes the job setting item selected by the setting item management unit and transmit the job execution screen data to the terminal apparatus via the web server.

According to an aspect of the present disclosure, an image forming system includes an image forming apparatus that is connected to a network, and a terminal apparatus that is connected to the network. The image forming apparatus includes a web server, a setting item management unit, and a web server management unit. The setting item management unit is configured to select, when the web server receives a request for job execution screen data from the terminal apparatus, a job setting item in association with at least one of the terminal apparatus and a user at the terminal apparatus from among all job setting items. The web server management unit is configured to generate the job execution screen data that includes the job setting item selected by the setting item management unit and transmit the job execution screen data to the terminal apparatus via the web server. The terminal apparatus includes a display and a web browser. The web browser is configured to transmit the request for the job execution screen data to the web server, receive the job execution screen data from the web server, and cause a job execution screen that includes the job setting item selected by the setting item management unit to be displayed on the display on the basis of the job execution screen data.

According to an aspect of the present disclosure, an image forming method includes: via an image forming apparatus connected to a network, receiving a request for job execution screen data from a terminal apparatus connected to the network, selecting a job setting item in association with at least one of the terminal apparatus and a user at the terminal apparatus from among all job setting items, generating the job execution screen data that includes the selected job setting item, and transmitting the job execution screen data to the terminal apparatus, and via the terminal apparatus, transmitting the request for the job execution screen data to the image forming apparatus, receiving the job execution screen data from the image forming apparatus, and causing a job execution screen that includes the selected job setting item to be displayed on a display of the terminal apparatus on the basis of the job execution screen data.

Additional features and advantages are described herein, and will be apparent from the following detailed description and the figures.

DETAILED DESCRIPTION

First Embodiment

Figure 1:
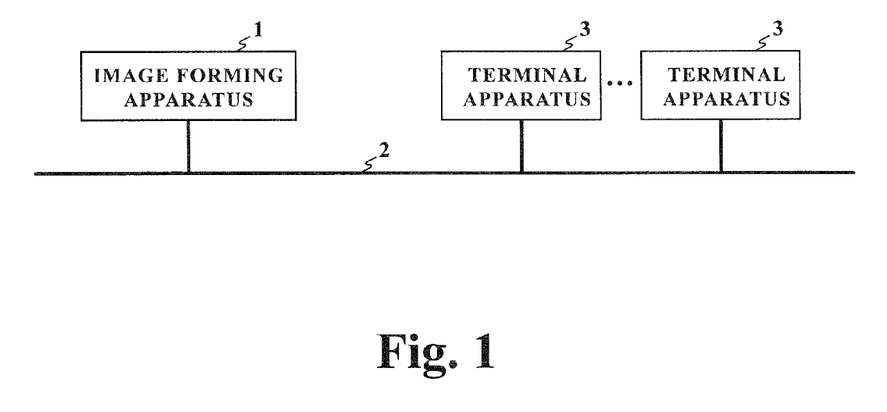
FIG. 1 shows a block diagram illustrating a configuration of an image forming system according to a first embodiment.

FIG. 1 shows a block diagram illustrating a configuration of an image forming system according to a first embodiment. An image forming apparatus 1 is connected to a network 2, and a terminal apparatus 3 is connected to the network 2. The image forming apparatus 1 includes a printer, a scanner, a copier, and a multifunction peripheral (MFP). The network 2 is not limited to a wired network, and part or all of the network 2 may be a wireless network.

Figure 2:
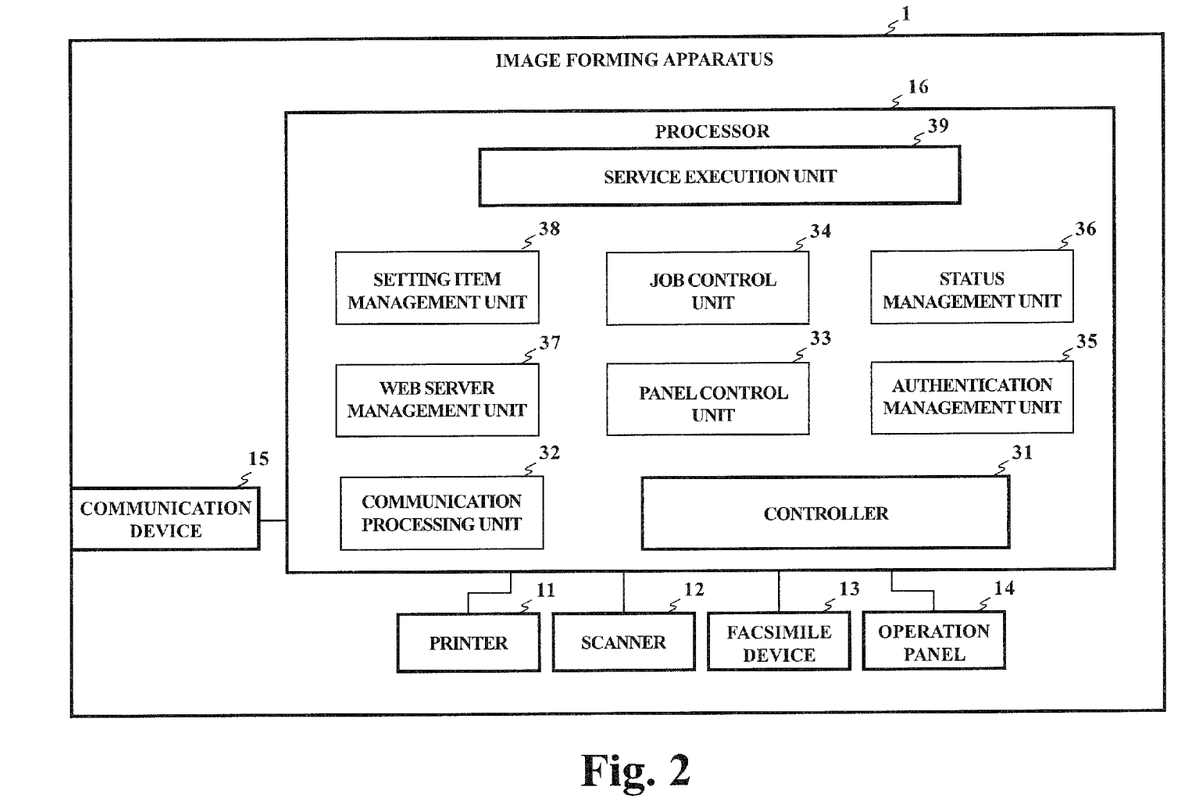
FIG. 2 shows a block diagram illustrating a configuration of an image forming apparatus included in the image forming system.

FIG. 2 shows a block diagram illustrating a configuration of the image forming apparatus 1. The image forming apparatus 1 includes a printer 11, a scanner 12, a facsimile device 13, an operation panel 14, a communication device 15, and a processor 16.

The printer 11 (as an internal device) prints a document image on the basis of print data. The scanner 12 (as an internal device) optically reads a document image from a document and generates image data of the document image. The facsimile device 13 (as an internal device) generates a facsimile signal from image data of a document image to be transmitted and transmits the facsimile signal, and receives the facsimile signal and converts the facsimile signal into the image data.

The operation panel 14 is located on the image forming apparatus 1, and includes a display that displays various kinds of information for a user and an input device that detects a user operation. The display may include, for example, a liquid crystal display. The input device includes key switches and a touch panel. The key switches include a hardware key and software keys that are displayed on the display and the touch panel. The operation panel 14 is a user interface of the image forming apparatus 1.

The communication device 15 is connected to the network 2, and performs data communications with another apparatus (such as the terminal apparatus 3) via the network 2 using a specified communication protocol. The communication device 15 includes a network interface and a modem.

The processor 16 is a computer that includes a central processing unit (CPU), a read only memory (ROM), and a random access memory (RAM) (not illustrated). The processor 16 loads programs from a storage device, the ROM, and the like into the RAM, causes the CPU to execute the programs, and implements various processing units.

After the start of the image forming apparatus 1, various programs are executed by the processor 16. The processor 16 implements the processing units such as an operating system (OS) (not illustrated), a controller 31, a communication processing unit 32, a panel control unit 33, a job control unit 34, an authentication management unit 35, a status management unit 36, a web server management unit 37, a setting item management unit 38, and a service execution unit 39.

The controller 31 (as the processing unit) monitors and controls the internal devices such as the printer 11, the scanner 12, the facsimile device 13, and the operation panel 14. The controller 31 notifies the status management unit 36 of status information on the internal devices.

The communication processing unit 32 controls the communication device 15 to execute data communications. The communication processing unit 32 includes a web server, and uses hypertext transfer protocol (HTTP) to communicate with a web browser of the terminal apparatus 3.

The panel control unit 33 causes the controller 31 to display various screens on the operation panel 14, detects the user operation via the operation panel 14, and causes a screen transition to be performed in accordance with the user operation and the like.

The job control unit 34 executes a job corresponding to a request received by the service execution unit 39. The job control unit 34 uses the controller 31 to operate the internal device (such as the printer 11) corresponding to a job type.

The authentication management unit 35 performs a user authentication to determine whether or not a user is permitted to log in. The authentication management unit 35 also determines whether or not a logged-in user is permitted to execute the jobs regarding one or more specified job types on the basis of job authorization information. The authentication management unit 35 specifies attribute information on the logged-in user (such as user's display name, electronic mail address, and the like). The attribute information on the user is in association with the user ID, and the attribute information on the logged-in user is specified on the basis of the user ID input by the user when the user logs in.

The status management unit 36 receives the status information on the internal device from the controller 31, and stores data that indicates the status information on the internal device at the present time.

The web server management unit 37 generates job execution screen data that includes job setting items registered by the setting item management unit 38 as an HTML file, and transmits the job execution screen data to the terminal apparatus 3 via the web server in the communication processing unit 32.

When a request (HTTP request) for the job execution screen data is received from the terminal apparatus 3 via the web server in the communication processing unit 32, the setting item management unit 38 selects a job setting item to be displayed on a job execution screen from among all the job setting items. The selected job setting item includes a parameter value that can be set by a user via the job execution screen, and is registered by the setting item management unit 38.

The service execution unit 39 receives a user request (for printing, copying, transmitting a facsimile, changing a system setting, and the like) on the basis of the user operation via the operation panel 14 using a command supplied from the terminal apparatus 3 via the network 2, and executes a process corresponding to the request. The jobs for printing, copying, and transmitting a facsimile are executed by the job control unit 34 via the service execution unit 39.

Figure 3:
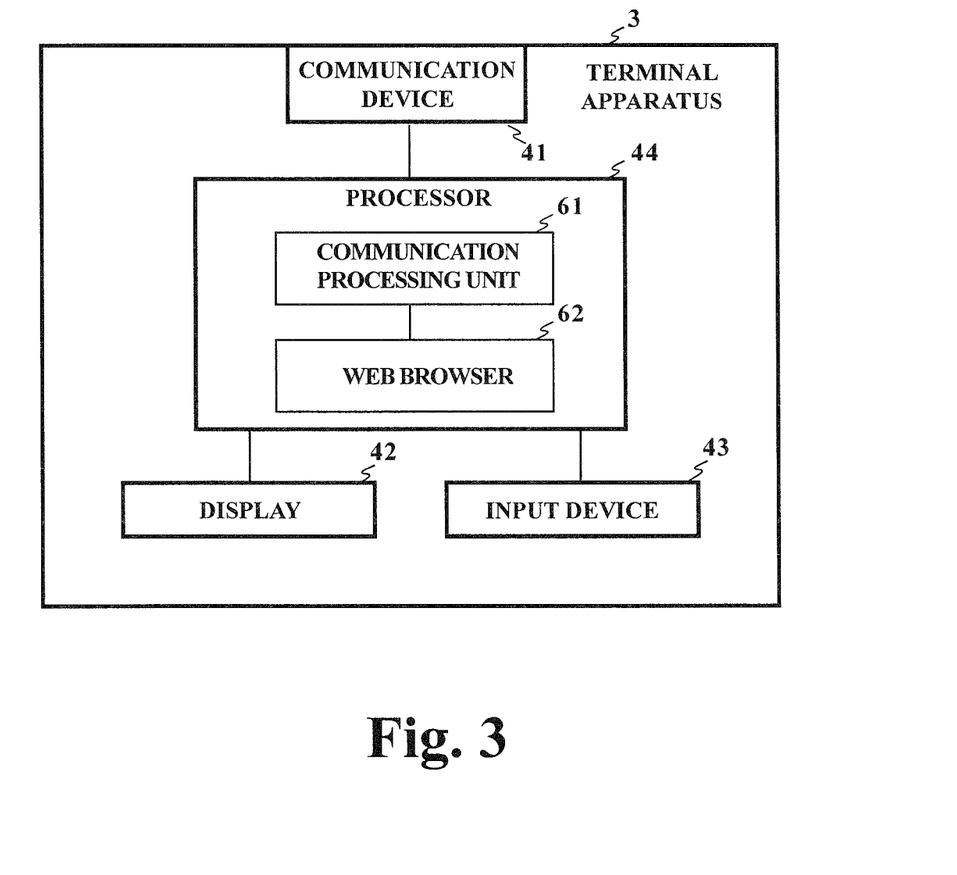
FIG. 3 shows a block diagram illustrating a configuration of a terminal apparatus included in the image forming system.

FIG. 3 shows a block diagram illustrating a configuration of the terminal apparatus 3. The terminal apparatus 3 includes a personal computer (such as a standard PC) and a portable electronic device (such as a mobile terminal apparatus) having network communication functionality and on which, for example, an OS and a web browser are installed.

The terminal apparatus 3 includes a communication device 41, a display 42, an input device 43, and a processor 44.

The communication device 41 is connected to the network 2, and performs data communications with another apparatus (such as the image forming apparatus 1) via the network 2 using a specified communication protocol. The communication device 41 includes a network interface and a modem.

The display 42 includes a liquid crystal display that displays various screens for a user on the terminal apparatus 3. The input device 43 includes a keyboard and a mouse that detect the user operation.

The processor 44 is a computer that includes a CPU, a ROM, and a RAM (not illustrated). The processor 44 loads programs from the storage device, the ROM, and the like into the RAM, and causes the CPU to execute the programs so as to implement various processing units.

After the start of the terminal apparatus 3, various programs are executed by the processor 44. The processor 44 implements the processing units such as an OS (not illustrated), a communication processing unit 61, and a web browser 62.

The communication processing unit 61 controls the communication device 41 to execute data communications. The web browser 62 causes the communication processing unit 61 to receive the HTML file from the web server using HTTP and causes the display 42 to display a screen on the basis of the HTML file.

The web browser 62 transmits a request for the job execution screen data to the web server in the communication processing unit 32 of the image forming apparatus 1 via the communication processing unit 61, and receives the HTML file that includes the job execution screen data from the web server. The web browser 62 causes the job execution screen that includes the job setting item selected by the setting item management unit 38 of the image forming apparatus 1 to be displayed on the display 42 on the basis of the job execution screen data.

Figure 4:
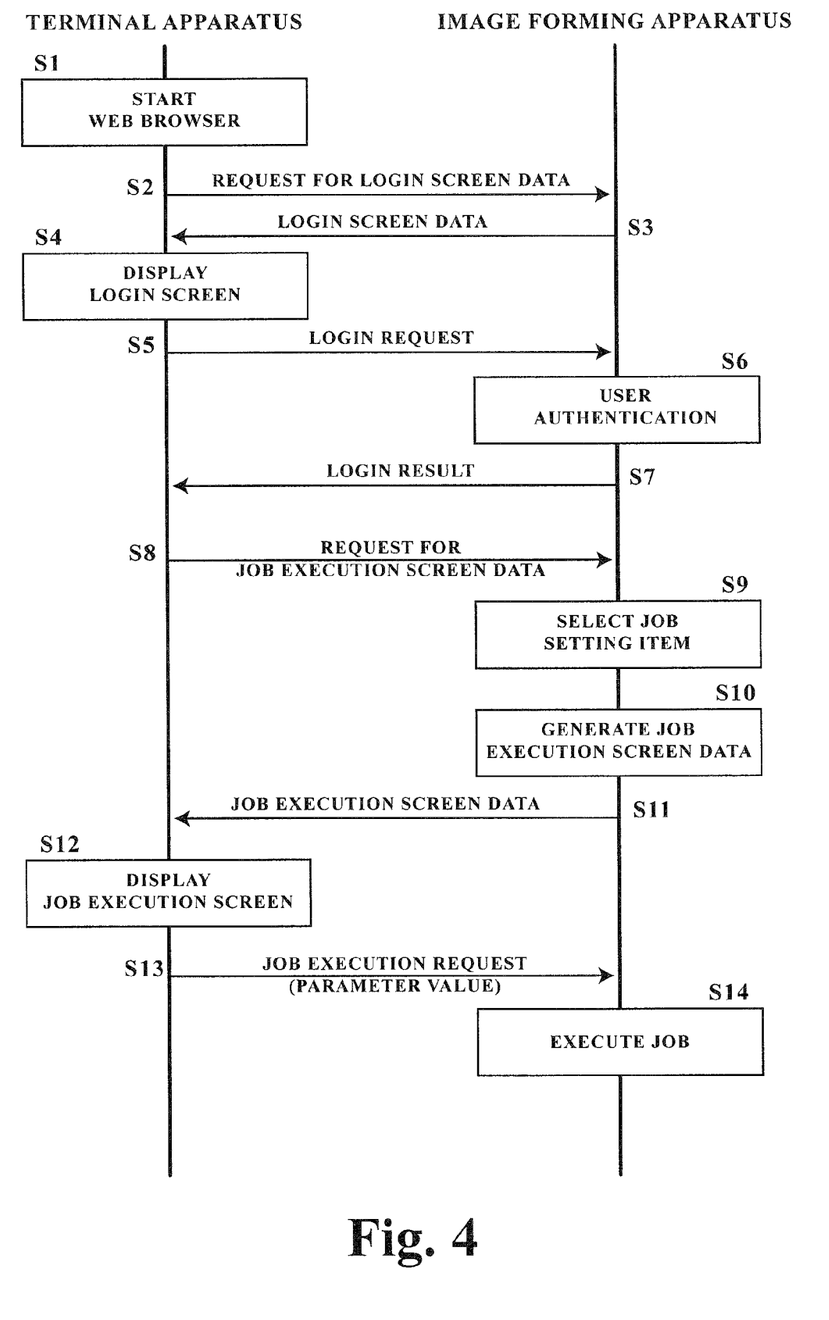
FIG. 4 shows a sequence diagram illustrating operations of the image forming apparatus and the terminal apparatus.

FIG. 4 shows a sequence diagram illustrating operations of the image forming apparatus 1 and the terminal apparatus 3.

At the terminal apparatus 3, the web browser 62 is started by the user operation via the operation panel 14 (Step S1).

When a specified URL may be selected on the display 42, the web browser 62 transmits a request for login screen data of the image forming apparatus 1 via the communication processing unit 61 (Step S2).

When the web server in the communication processing unit 32 receives the request, the image forming apparatus 1 transmits the login screen data of the HTML file to the web browser 62 via the communication processing unit 61 (Step S3).

When the login screen data is received via the communication processing unit 61, the web browser 62 causes a login screen to be displayed on the display 42 on the basis of the login screen data (Step S4).

The login screen includes input fields for the user ID and a password, and a transmission button. The user inputs user information (for example, user ID and password) to the input fields via the input device 43, and depresses the transmission button. The web browser 62 transmits a login request that includes the user ID and the password to the image forming apparatus 1 via the communication processing unit 61 (Step S5).

At the image forming apparatus 1, when the web server in the communication processing unit 32 receives the login request, the authentication management unit 35 performs a user authentication on the basis of the user ID and the password that are included in the login request (Step S6). If the user authentication at the terminal apparatus 3 is successful, the login is permitted, and otherwise the login is rejected.

The web server in the communication processing unit 32 transmits a login result to the web browser 62 via the communication processing unit 61 (Step S7).

If the login is permitted, the authentication management unit 35 generates an authentication token for the user. The web server in the communication processing unit 32 transmits the authentication token along with the login result to the web browser 62 via the communication processing unit 61. The web browser 62 adds the authentication token to a request to the web server in the communication processing unit 32 until logout. The authentication management unit 35 manages the authentication token in association with the user ID.

When the login result indicating that the login is permitted is received via the communication processing unit 61, the web browser 62 transmits the request for the job execution screen data to the web server in the communication processing unit 32 (Step S8). The job execution screen data is formed of the HTML file, and the request for the job execution screen data is formed of the HTTP request.

The job execution screen is an operation screen for setting and changing the parameter value of the job setting item, confirming a job execution request, and the like regarding a job executed from the web browser 62 of the terminal apparatus 3, for example, printing, transmission, or downloading of document data stored in a server or the storage device of the image forming apparatus 1.

When the web server in the communication processing unit 32 receives the request for the job execution screen data, the setting item management unit 38 specifies at least one of an attribute of the terminal apparatus 3 (such as a type of the terminal apparatus or a type of the web browser 62) that has transmitted the request and the logged-in user at the terminal apparatus 3, and selects the job setting item in association with at least one of the terminal apparatus 3 and the user (Step S9).

In the first embodiment, the job setting item in association with the user is selected. The authentication management unit 35 specifies the user information (for example, user ID) in association with the authentication token added to the request, and the setting item management unit 38 selects the job setting item registered previously in association with the specified user information.

For example, the registered job setting item includes the job setting item of a function that is used often by the user or that is permitted for use (for example, a double-sided printing setting, a multiple pages grouping per paper setting, and/or an enlargement/reduction printing setting), and excludes the job setting item of the function that is not used by the user or that is not permitted for use (for example, a color mode setting).

The job setting item on which the parameter value can be set by the user is registered by the user or an administrator. When the job setting item is described in a menu such as a pull-down menu, an option that is used often by the user or that is permitted for use may be registered previously by the user or the administrator as the option (parameter value that can be set by the user) included in the menu.

The web server management unit 37 generates the job execution screen data that includes the job setting item selected by the setting item management unit 38 in the HTML file (Step S10). The selected job setting item is described in HTML, JavaScript, and the like so that the user can set the parameter value when a job setting screen is displayed on the display 42 of the terminal apparatus 3. The web server management unit 37 causes the web server in the communication processing unit 32 to transmit the HTML file to the web browser 62 of the terminal apparatus 3 (Step S11).

When the HTML file that includes the job execution screen data is received via the communication processing unit 61, the web browser 62 of the terminal apparatus 3 causes the job execution screen on the basis of the job execution screen data to be displayed on the display 42 (Step S12).

Figure 5:
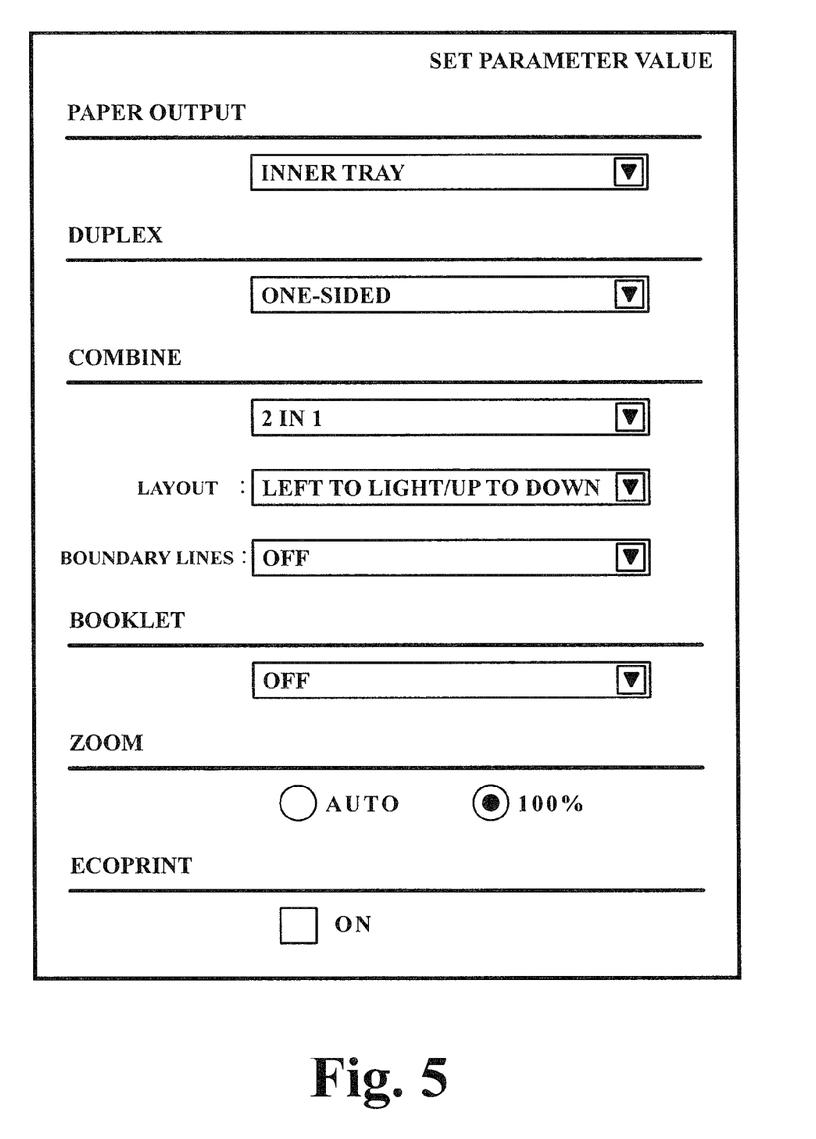
FIG. 5 shows a diagram illustrating an example of a setting screen for parameter values in a job execution screen displayed on a display of the terminal apparatus.

FIG. 5 shows a diagram illustrating an example of a setting screen for parameter values in the job execution screen displayed on the display 42 of the terminal apparatus 3. On the job execution screen illustrated in FIG. 5, the job setting items of "PAPER OUTPUT" (paper delivery destination setting), "DUPLEX" (double-sided printing setting), "COMBINE"

(multiple pages grouping per paper setting), "BOOKLET" (booklet setting), "ZOOM" (enlargement/reduction printing setting), and "ECOPRINT" (eco-printing setting) are registered and displayed, and the other job setting items that are not registered are not displayed.

The user at the terminal apparatus 3 sets the parameter value for each of the job setting items on the job execution screen via the input device 43. When the user at the terminal apparatus 3 confirms the job execution request on the job execution screen via the input device 43, the web browser 62 transmits the parameter values of the job setting items that are set on the job execution screen along with the job execution request to the web server in the communication processing unit 32 via the communication processing unit 61 (Step S13).

When the job execution request and the parameter values of the job setting items are received, the web server in the communication processing unit 32 provides the service execution unit 39 with the job execution request and the parameter values. The service execution unit 39 causes the job control unit 34 to execute the job specified by the job execution request. The job control unit 34 executes the job on which the parameter values of the job setting items are reflected (Step S14).

According to the first embodiment, at the image forming apparatus 1, when the web server in the communication processing unit 32 receives the request for the job execution screen data from the terminal apparatus 3, the setting item management unit 38 selects the job setting item in association with at least one of the terminal apparatus 3 and the user at the terminal apparatus 3 from among all the setting items. The web server management unit 37 generates the job execution screen data that includes the job setting item selected by the setting item management unit 38, and transmits the job execution screen data to the terminal apparatus 3 via the web server in the communication processing unit 32. At the terminal apparatus 3, the web browser 62 transmits the request for the job execution screen data to the web server in the communication processing unit 32 via the communication processing unit 61, and receives the job execution screen data from the web server. The web browser 62 causes the job execution screen to be displayed on the display 42 on the basis of the job execution screen data.

As described above, the web browser 62 causes the job execution screen that includes the appropriate number of job setting items to be displayed on the display 42 of the terminal apparatus 3. Therefore, a job execution screen that is easy for the user to operate may be displayed on the display 42 of the terminal apparatus 3. Since the job setting item displayed on the job execution screen can be set to be often used by the user, which is previously registered by the user, the job execution screen that is easier for the user to operate may be displayed on the display 42 of the terminal apparatus 3. Further, since the job setting item displayed on the job execution screen can be set to be permitted for use, which is previously registered by the administrator, the job execution screen on which authorization information on the user is reflected may be displayed on the display 42 of the terminal apparatus 3.

Second Embodiment

At an image forming system according to the second embodiment, when the request for the job execution screen data (HTTP request) is received from the terminal apparatus 3 via the web server in the communication processing unit 32, the setting item management unit 38 of the image forming apparatus 1 selects the job setting item in association with a client type (such as the type of the terminal apparatus or the type of the web browser 62) indicating the attribute of the terminal apparatus 3 from among all the setting items.

The configuration of the image forming system according to the second embodiment is the same as or similar to that of the first embodiment. In the second embodiment, as described below, the job execution screen data is generated by the setting item management unit 38 and the web server management unit 37 of the image forming apparatus 1.

Figure 6:
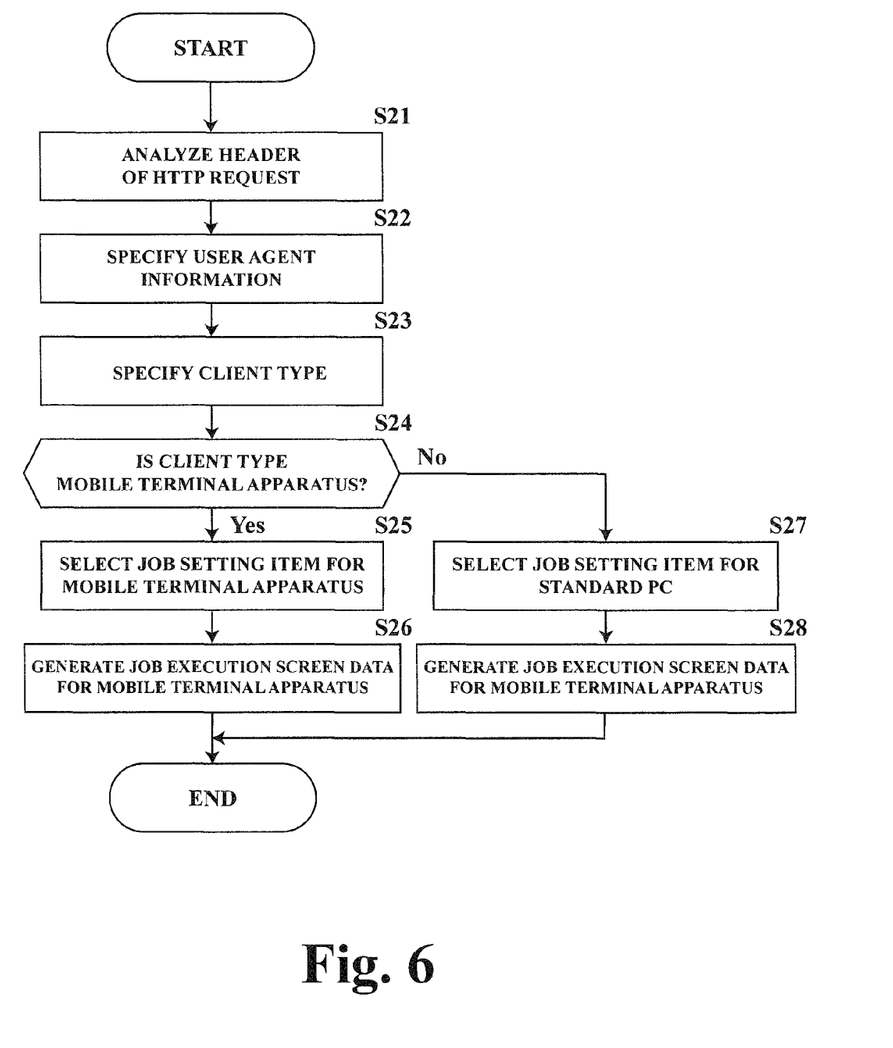
FIG. 6 shows a flowchart illustrating a process for generating the job execution screen data according to a second embodiment.

FIG. 6 shows a flowchart illustrating a process for generating the job execution screen data according to the second embodiment.

At the image forming apparatus 1, when the request for the job execution screen data (HTTP request) is received from the terminal apparatus 3 via the web server in the communication processing unit 32, the setting item management unit 38 analyzes a header of the HTTP request (Step S21), and specifies user agent information included in the header (Step S22). The user agent information is information described in the header of the HTTP request automatically by the web browser, and includes information indicating the type of at least one of the terminal apparatus 3 and the web browser 62.

The setting item management unit 38 specifies the client type of the terminal apparatus 3 on the basis of the user agent information (Step S23). In the second embodiment, the client type is one of the mobile terminal apparatus and the standard PC. For example, when the user agent information (partially or fully) matches specified user agent information that is previously registered, the client type may be determined as the mobile terminal apparatus.

The mobile terminal apparatus may be a portable electronic device that has a network function and small size display 42, and may include a cellular phone, a smartphone, and a game machine. Therefore, for example, a laptop personal computer may be classified as a standard PC.

For example, the terminal apparatus 3 in which a built-in system is stored and a web browser is preinstalled may include a model name in the user agent information. The terminal apparatus 3 is determined as the mobile terminal apparatus on the basis of the model name. Further, for example, when the specified user agent information indicates the user agent information on the web browser for the built-in system, the terminal apparatus 3 may be determined as the mobile terminal apparatus.

The setting item management unit 38 determines whether or not the client type of the terminal apparatus 3 is the mobile terminal apparatus (Step S24).

If the client type of the terminal apparatus 3 is the mobile terminal apparatus, the setting item management unit 38 selects the job setting item for the mobile terminal apparatus (Step S25). The web server management unit 37 generates the job execution screen data that includes the selected job setting item (Step S26).

If the client type of the terminal apparatus 3 is not the mobile terminal apparatus (that is, if it is a standard PC), the setting item management unit 38 selects the job setting item for the standard PC (Step S27). The web server management unit 37 generates the job execution screen data that includes the selected job setting item (Step S28).

As described above, different job setting items are selected between the case where the client type is the mobile terminal apparatus and the case where the client type is not the mobile terminal apparatus.

The number of job setting items selected if the client type is the mobile terminal apparatus is smaller than the number of job setting items selected if the client type is the standard PC. This reduces the number of job setting items displayed on the small size display 42 of the mobile terminal apparatus. Therefore, a job execution screen that is easy for the user to operate is displayed on the small size display 42 of the terminal apparatus 3.

In the second embodiment, as in the first embodiment, the job setting item included in the job execution screen data is previously registered in the setting item management unit 38 by the user or the administrator in association with the user agent information. It should be noted that the setting item management unit 38 may store the size of the display 42 in association with the user agent information, and may automatically select the job setting item to be included in the job execution screen data on the basis of the size of the display 42.

According to the second embodiment, the job execution screen that includes the appropriate number of job setting items in association with the client type is displayed on the display 42 of the terminal apparatus 3.

The present disclosure of the embodiment includes various other embodiments. For example, other designs may be used in which the above-described components are each present.

In the first embodiment, the job setting item in association with the user is selected, while in the second embodiment, the job setting item in association with the client type of the terminal apparatus 3 is selected. The present invention is not limited thereto, and the job setting item in association with both the user and the terminal apparatus 3 may be selected. For example, both the job setting item in association with the standard PC and the job setting item in association with the mobile terminal apparatus may be registered for each user, and as in the above-described first and second embodiments, the user and the client type may be specified and the job setting item in association with the user and the client types may be selected.

In the first and/or second embodiment, when the user logs in to the image forming apparatus 1 by a group code instead of the user ID, the setting item management unit 38 may select the job setting item in association with the group code as the job setting item.

In the first and/or second embodiment, the job setting item included in the job execution screen data may be customized by an operation performed by the user or the administrator via the image forming apparatus 1 or the terminal apparatus 3.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus that is connected to a network, the apparatus comprising:
   a web server;
   an authentication management unit configured to: i) perform, when the web server receives a login request by a user at a terminal apparatus that is connected to the network, a user authentication on the basis of user information included in the login request, and ii) generate an authentication token for the user at the terminal apparatus when the user authentication is successful, wherein the web server is configured to transmit the authentication token to the terminal apparatus and add the authentication token to a request to the web server from the terminal apparatus until logout,
   a setting item management unit, wherein when the web server receives the request for job execution screen data, including the authentication token, composed of a hypertext transfer protocol (HTTP) request from the terminal apparatus that is connected to the network, the setting item management unit is configured to: i) specify a client type of the terminal apparatus based on user agent information included in a header of the HTTP request, ii) specify the user at the terminal apparatus on the basis of the user information included in the authentication token, and iii) select a job setting item in association with the terminal apparatus and a user at the terminal apparatus from among all job setting items based on the client type and the user information; and
   a web server management unit configured to generate the job execution screen data that includes the job setting item selected by the setting item management unit and transmit the job execution screen data to the terminal apparatus via the web server,
   wherein the setting item management unit is further configured to: i) determine whether the client type of the terminal apparatus is a portable electronic device or a personal computer based on the user agent information included in the header of the HTTP request that is indicative of user agent information on a web browser for a built-in system, ii) store a size of a display of the terminal apparatus in association with the user agent information, and iii) automatically select the job setting item in association with the terminal apparatus based on the size,
   wherein a number of the job setting items that is selected when the client type is the portable electronic device is smaller than a number of the job setting items selected when the client type is the personal computer, and
   wherein a given job setting item from among the job setting items, in association with the terminal apparatus and the user at the terminal apparatus, includes an operation that has been used by the user a threshold number of times within a threshold period of time and is permitted for use based on the given job setting item being registered by an administrator.

2. The image forming apparatus according to claim 1, wherein the job setting item is registered by at least one of the user and an administrator.

3. An image forming system, comprising:
   an image forming apparatus that is connected to a network; and
   a terminal apparatus that is connected to the network,
   the image forming apparatus comprising:
      a web server;
      an authentication management unit configured to: i) perform, when the web server receives a login request by a user at a terminal apparatus that is connected to the network, a user authentication on the basis of user information included in the login request, and ii) generate an authentication token for the user at the terminal apparatus when the user authentication is successful, wherein the web server is configured to transmit the authentication token to the terminal apparatus and add the authentication token to a request to the web server from the terminal apparatus until logout,
      a setting item management unit, wherein when the web server receives the request for job execution screen data, including the authentication token, composed of a hypertext transfer protocol (HTTP) request from the terminal apparatus, the setting item management unit is configured to: i) specify a client type of the terminal apparatus based on user agent information included in a header of the HTTP request, ii) specify the user at the terminal apparatus on the basis of the user information included in the authentication token, and iii) select a job setting item in association with the terminal apparatus and a user at the terminal apparatus from among all job setting items based on the client type and the user information; and a web server management unit configured to generate the job execution screen data that includes the job setting item selected by the setting item management unit and transmit the job execution screen data to the terminal apparatus via the web server, the terminal apparatus comprising:
a display; and
a web browser configured to transmit the request for the job execution screen data to the web server, receive the job execution screen data from the web server, and cause a job execution screen that includes the job setting item selected by the setting item management unit to be displayed on the display based on the job execution screen data, wherein the setting item management unit is further configured to: i) determine whether the client type of the terminal apparatus is a portable electronic device or a personal computer based on the user agent information included in the header of the HTTP request that is indicative of user agent information on a web browser for a built-in system, ii) store a size of a display of the terminal apparatus in association with the user agent information, and iii) automatically select the job setting item in association with the terminal apparatus based on the size, wherein a number of the job setting items that is selected when the client type is the portable electronic device is smaller than a number of the job setting items selected when the client type is the personal computer, and wherein a given job setting item from among the job setting items, in association with the terminal apparatus and the user at the terminal apparatus, includes an operation that has been used by the user a threshold number of times within a threshold period of time and is permitted for use based on the given job setting item being registered by an administrator.

4. An image forming method, comprising:
via an image forming apparatus connected to a network,
performing, when a login request made by a user at a terminal apparatus that is connected to the network is received, a user authentication on the basis of user information included in the login request,
generating an authentication token for the user at the terminal apparatus when the user authentication is successful,
transmitting the authentication token to the terminal apparatus,
adding the authentication token to a request to the image forming apparatus from the terminal apparatus until logout,
receiving the request for job execution screen data, including the authentication token, composed of a hypertext transfer protocol (HTTP) request from the terminal apparatus that is connected to the network,
specifying a client type of the terminal apparatus based on user agent information included in a header of the HTTP request, specifying the user at the terminal apparatus on the basis of the user information included in the authentication token,
determining whether the client type of the terminal apparatus is a portable electronic device or a personal computer based on the user agent information included in the header of the HTTP request that is indicative of user agent information on a web browser for a built-in system,
selecting a job setting item in association with the terminal apparatus and the user at the terminal apparatus from among all job setting items based on the client type and the user information,
generating the job execution screen data that includes the selected job setting item, and
transmitting the job execution screen data, including the authentication token, to the terminal apparatus; and
via the terminal apparatus,
transmitting the request for the job execution screen data to the image forming apparatus,
receiving the job execution screen data from the image forming apparatus, and
causing a job execution screen that includes the selected job setting item to be displayed on a display of the terminal apparatus based on the job execution screen data, and
wherein the image forming apparatus is configured to store a size of a display of the terminal apparatus in association with the user agent information and automatically select the job setting item in association with the terminal apparatus based on the size,
wherein a number of the job setting items that is selected when the client type is the portable electronic device is smaller than a number of the job setting items selected when the client type is the personal computer, and
wherein a given job setting item from among the job setting items, in association with the terminal apparatus and the user at the terminal apparatus, includes an operation that has been used by the user a threshold number of times within a threshold period of time and is permitted for use based on the given job setting item being registered by an administrator.

5. An image forming apparatus that is connected to a network, the apparatus comprising:
a web server;
an authentication management unit configured to: i) perform, when the web server receives a login request by a user at a terminal apparatus that is connected to the network, a user authentication on the basis of user information included in the login request, and ii) generate an authentication token for the user at the terminal apparatus when the user authentication is successful, wherein the web server is configured to transmit the authentication token to the terminal apparatus and add the authentication token to a request to the web server from the terminal apparatus until logout,
a setting item management unit, wherein when the web server receives the request for job execution screen data, including the authentication token, composed of a hypertext transfer protocol (HTTP) request from the terminal apparatus that is connected to the network, the setting item management unit is configured to: i) specify a client type of the terminal apparatus based on user agent information included in a header of the HTTP request ii) specify the user at the terminal apparatus on the basis of the user information included in the authentication token, and iii) select a job setting item in association with the terminal apparatus and a user at the terminal apparatus from among all job setting items based on the client type and the user information; and a web server management unit configured to generate the job execution screen data that includes the job setting item selected by the setting item management unit and transmit the job execution screen data to the terminal apparatus via the web server, wherein the user agent information includes a model name, wherein the terminal apparatus includes a built-in system stored therein and a preinstalled web browser, wherein the setting item management unit is further configured to: i) determine the client type of the terminal apparatus is a portable electronic device or a personal computer based on the model name of the user agent information included in the header of the HTTP request, ii) store a size of a display of the terminal apparatus in association with the user agent information, and iii) automatically select the job setting item in association with the terminal apparatus based on the size, wherein a number of the job setting items that is selected when the client type is the portable electronic device is smaller than a number of the job setting items selected when the client type is the personal computer, and wherein a given job setting item from among the job setting items, in association with the terminal apparatus and the user at the terminal apparatus, includes an operation that has been used by the user a threshold number of times within a threshold period of time and is permitted for use based on the given job setting item being registered by an administrator.

* * * * *